United States Patent [19]

Singer et al.

[11] Patent Number: 5,234,127
[45] Date of Patent: Aug. 10, 1993

[54] PNEUMATIC AUTOMATIC FASTENER FEEDER

[75] Inventors: Martin H. Singer, Lauderhill; Nathan Singer, Tamarac; Russell L. Sedlack, II, Fort Lauderdaie, all of Fla.

[73] Assignee: Nasco Industries Inc., Ft. Lauderdale, Fla.

[21] Appl. No.: 730,058

[22] Filed: Jul. 15, 1991

[51] Int. Cl.$^5$ .............................................. B65H 9/00
[52] U.S. Cl. .................................... 221/165; 221/172; 221/182; 221/186
[58] Field of Search ............... 221/171, 172, 165, 163, 221/182, 183, 184, 186; 227/114, 116–118, 119, 120; 87/57.37, 435

[56] References Cited

U.S. PATENT DOCUMENTS

| 707,138 | 8/1902 | Mayo et al. | 221/171 X |
| 2,025,273 | 12/1935 | Dellaree | 221/182 X |
| 2,613,374 | 10/1952 | Gora | 221/182 X |
| 4,101,054 | 7/1978 | Frost et al. | 221/278 |
| 4,732,296 | 3/1988 | Heck et al. | 221/172 |

Primary Examiner—David H. Bollinger

[57] ABSTRACT

An automatic fastener feeder is disclosed utilizing a rotating drum in combination with a pivoting track arrangement. Racheting apparatus is utilized to rotate the drum at intervals of time, which is initiated by an operator-generated demand for a single fastener. Gravity is utilized to drop individual fasteners onto and into the track arrangement. Up-and-down movement of the track arrangement provides for the axial movement of individual fasteners along the length of the track and into an escapement mechanism attached to the end thereof.

11 Claims, 2 Drawing Sheets

PNEUMATIC AUTOMATIC FASTENER FEEDER

BACKGROUND OF THE INVENTION

1. Field of the Invention

This invention relates in general to the field of pneumatic automatic fastener feeding machines and in particular to the field of automatic fastener feeding machines having a pivoting track arrangement in combination with a racheting supply hopper.

2. Description of the Prior Art

An automatic fastener feeding machine is the terminology which is commonly applied to a machine which arranges fasteners, such as screws, rivets, headed pins, or the like, from a bulk, loose form into an arrangement whereby the fasteners are aligned in a single column on a track arrangement and then individually delivered by an escapement mechanism to an air driven or electric applicator such as a screw driver. The screw driver is then utilized to drive a single fastener through a hole within one component in order to fasten the one component to another. Further, it is common practice in such prior art automatic fastener feeding machines to utilize a pneumatic source, such as air in combination with electrical energy, to operate or drive various mechanisms within the apparatus. The purpose of such automatic fastener feeding machines is, of course, to speed up production by providing automatic delivery of a fastener to a screw driver which both holds the fastener in place and screws the same into position. The net result being rapid assembly of various components using fasteners.

Since speed of production is the main objective of such machines, any portion of the machine which tends to jam or malfunction in any manner results in a work stoppage or delay which is contrary to such main objective. Each operation performed upon a fastener within the automatic feeding machine from its bulk supply disposition to its fastener disposition and any point therebetween must necessarily occur in a serial mode whereby one step follows the other. Any one step, therefore, if it is not accomplished properly, can delay operations or even cause a complete shut down of the machine and production. In today's modern factories, any unnecessary delay or production shutdown due to malfunctioning of a machine, must be avoided at all reasonable cost.

Moreover, industry requires that fastener feeding machines be adaptable to work with fasteners which are mass produced. Mass production of fasteners generally involves large variations or tolerances for a given characteristic of the fastener such as its head height, head diameter, shank diameter, shank length, etc., than corresponding individualized custom machined fasteners. Since automatic fastener feeding machines must accommodate such mass produced fasteners, the handling of such fasteners as well as the operations performed on the fasteners by an automatic fastener feeding machine requires even further design constraints on such machines. As a result, the prior art automatic fastener feeding machines tend to be relatively complicated and require an undue amount of precision manufacturing in order to produce long lasting and reliable fastener feeding machines. Unfortunately, such design constraints also, have in the past, resulted in relatively expensive automatic fastener feeding machines which high cost, of necessity, tends to prevent usage in production plants where there is not a great profit gain or cost reduction by utilizing the automatic fastener feeding machines.

It is a practice in the prior art to utilize electrical energy to drive a motor which rotates a supply hopper containing the fasteners or vibrates the fasteners so they travel along an uphill spiral through sorting and orienting gates. From the spiral or the hopper, the fasteners travel along a track under the influence of gravity which may be assisted by air or electric motive power. Then, air is customarily used in order to operate an escape mechanism whereby a single fastener is delivered from the automatic fastener feeding apparatus to a pneumatically- or electrically-operated fastener driver. The use of these two types of energy sources, that is, electricity and air, while allowing the use of historically reliable components such as electric motors and air cylinders, complicates the automatic fastener feeding machine by requiring a work station to have both types of energy sources available. Accordingly, it is a primary objective of the present invention to provide reliable automatic fastener feeding apparatus which utilizes only a pneumatic source as the source of energy for the apparatus.

In the prior art, the track arrangement is one whereby a plurality of screws or other like headed fasteners are delivered in a single row and such that as one fastener is utilized, the other fasteners move down the track making room for a new fastener to be added to the line of fasteners on the track. In this art, two types of energy sources have been utilized to move the fasteners along the track, to wit: gravity and/or vibrations which when applied to a track arrangement keep the fasteners constantly in motion and prevents snagging or binding of the fasteners upon each other. Obviously, it is preferable that only a gravity feed type of arrangement be utilized for automatic fastener feeding machines and thereby eliminate another energy supply and any complications associated with the mechanism thereof. This, therefore, comprises a main objective of the present invention.

In conjunction with the use of gravity feeding of the fasteners along a track mechanism, and the utilization of solely a pneumatic source of energy, further objectives of the present invention involve providing an automatic fastener feeding machine which is yet also simple in construction and therefore inexpensive and yet highly reliable.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention comprises a pneumatically driven automatic fastener feeding machine which utilizes gravity to advance fasteners along a track thereof and pneumatic power to rotate a supply hopper together in combination with a pivotable track arrangement.

The present invention provides an angled base member on which is mounted a fastener supply hopper for rotational movement thereon, comprising a feeder drum having a plurality of vanes radially attached to an inner cylindrical surface thereof. A pivotally attached air cylinder is connected between the angled base member and a racheting mechanism attached to a shaft emanating from the feeder drum. Upward movement of the piston of the air cylinder allows a pivoting head to slide past pawls arranged around the drum shaft: downward motion of the piston of the air cylinder results in engagement of the pivotable head with one of the pawls resulting in rotation of the drum between an angle of approximately 45° to 90°. The drum rotation causes one or more vanes within the drum to release the fasteners temporarily positioned thereon down onto a funnel arrangement attached to the end of a track arrangement which is positioned within the drum hopper. The funnel feeds single fasteners onto the track arrangement whereby the fasteners are arranged along the length thereof in a single line. While the drum is rotating, the track arrangement is being pivoted toward the horizontal such that the end of the track arrangement within the feeder drum becomes physically lowered while the fasteners are being dropped from the appropriate vanes onto the funnel attached to the end of the track arrangement. Subsequent upward motion of an air cylinder attached to the track arrangement increases the vertical angle of the track arrangement allowing gravity to feed the fasteners downward along the track thereof. Sequential operation of a third air cylinder operates an escape mechanism in conjunction with the increased vertical angle of the track arrangement and results in delivery of a single fastener to a flexible tube attached to the escape mechanism. The fastener is then fed to a conventional pneumatically operated fastener driver. It is to be noted that the present invention may be utilized with any appropriate escape mechanism as is conventionally known in the art.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
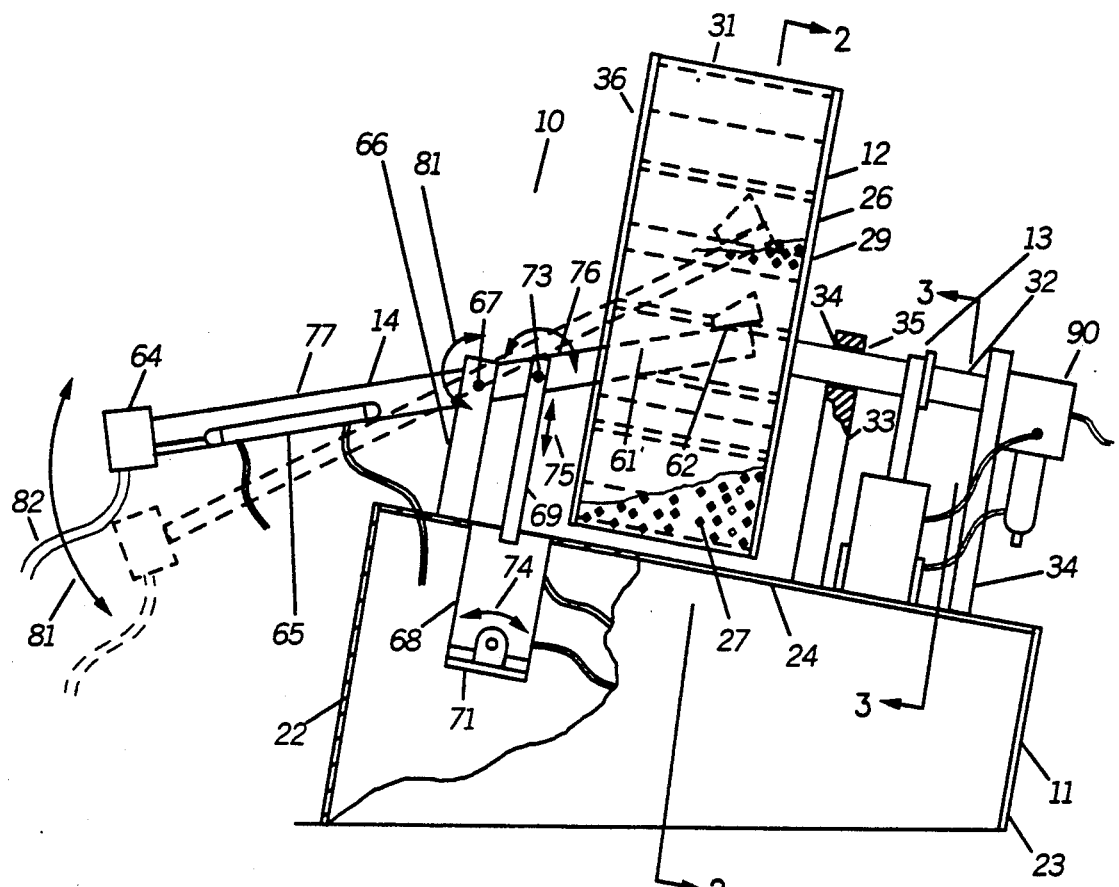
FIG. 1 is a side profile view of the inventive pneumatically operated automatic fastener feeding apparatus shown partially in cross section.
Figure 3:
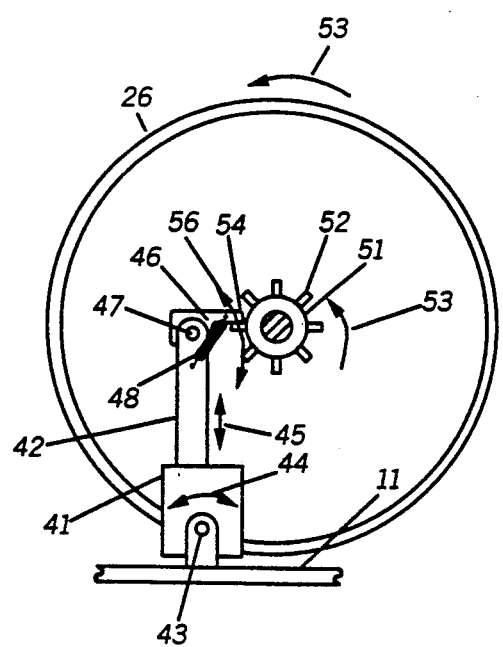
FIG. 3 is a cross-sectional view of the drum hopper and base taken along the line 3—3 of FIG. 1.

Reference is now made to the various figures of the drawings, wherein like characteristics and features of the present invention shown in the various figures are designated by the same reference numerals. In FIG. 1 thereof, the inventive pneumatically operated automatic fastener feeding apparatus 10 is shown therein and in general comprises a base 11, a cylindrical feeder drum assembly 12, a feeder drum support and rachet movement assembly 13, and a gravity feed track arrangement 14. Details of the feeder drum support and racheting mechanism 13 are shown in FIG. 2 while the details of the feeder drum and support mechanism 12 are shown in FIG. 3.

Still referring to FIG. 1, base 11 may comprise a box-like hollow support member made from a structurally strong material such as sheet steel. A front side 22 is higher than a back side 23, both of which are perpendicularly attached to a topside member 24. Side members 25 attached to top member 24 and sides 22 and 23 complete the structure. Due to the difference in height between front and back members 22 and 23 respectively, base 11 rests on a horizontal surface with a backward tilt. The main purpose of this backward tilt is to orient the drum member 26 of feeder drum assembly 12, also in a backward tilt so that individual fastener members 27 stored within drum 26 stay within the confines thereof when drum 26 is rotated. Rotation of drum 26 causes fastener members 27 to be lifted by vanes 28 to the approximate top of drum member 26 and then fall by gravity due to the increasing vertical angle of vanes 28 as they individually reach the top of drum 26. Fastener members 27 may comprise screws, rivets, headed pins, and other like headed fasteners. Any other orientation of drum 26 would result in fastener members 27 being expelled out from within drum 26 during operation of the automatic fastener feeding mechanism.

Figure 2:
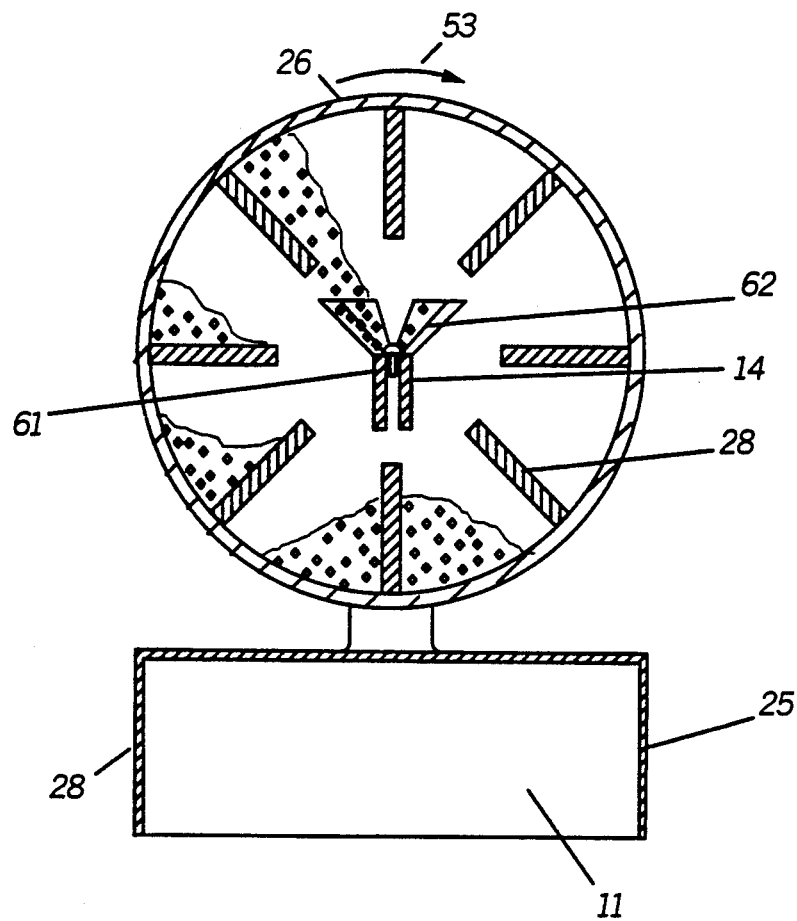
FIG. 2 is a cross-sectional view of the racheting mechanism taken along the line 2—2 of FIG. 1.

Accordingly, while also referring to FIG. 2, it may be seen that drum member 26 comprises a hollow cylindrical member having a circumferential side wall 31 which is perpendicularly attached to a circular plate member 29. Vanes 28 are radially connected to the circumferential side wall 31 and may be attached thereto by any conventional method, such as bolting, welding or gluing. Similarly, circumferential wall 31 may be conventionally attached to plate member 29 by such conventional means as bolting, welding or gluing, depending upon the material from which drum 26 is made, i.e., steel or plastic.

An axial shaft 32 is fixedly attached to the center of plate member 29 and extends therefrom in a rearward direction. Post members 33 are attached to base member 11 and are used to structurally support and positionally locate drum member 26 and air filter, regulator and lubrication apparatus 90. Accordingly, axial shaft 32 extends through holes 34 of post members 33. A bushing 35 is positioned between shaft member 32 and hole 34 through each tubular post member 33 to allow drum member 26 to rotate about axial shaft 32. A cover plate 36 may be removably attached to the front portion of drum 26 or to base member 11 to further ensure that fasteners 27 remain therewithin during operation of the automatic fastener feeding apparatus 10. Cover plate 36 may be made from a transparent plastic so that the machine operator can see within the drum 26 and add fasteners 27 as needed.

Rotation of drum 26 is accomplished by support and racheting apparatus 13 which is more clearly shown in side profile in FIG. 3 of the drawings. Racheting apparatus 13 comprises an air cylinder 41 pivotally attached 43 to support member 11 which attachment 43 allows cylinder 41 and piston 42 to rock back and forth in a direction of arrows 44. The sequence of operation of air cylinder 41 is such that it moves once upward and once downward in the direction of arrows 45 during one complete cycle, during which cycle a single fastener 27 is ejected from the escapement mechanism attached to track arrangement 14. A pawl member 46 is pivotally attached 47 to piston 42 with a spring 48 being utilized as a biasing member to maintain pawl 46 in a downward position relative to piston 42. This downward position, in addition to the ability of pawl member 46 to pivot 47 about piston 42, allows the engagement end 54 thereof to clear, without interference, lugs 52 arranged circumferentially around lug wheel 51. Lug wheel 51 is fixedly attached to axial 32 of drum assembly 12 such that rotation of lug wheel 51 causes a corresponding rotation of drum 26.

In operation, the movement of piston 42 in an upward direction results in pawl member 46 being positioned in a downward mode so as to enable engagement end 54 thereof to clear lugs 52 as piston 42 and pawl 46 move upward relative to lug wheel 51. The downward motion of piston 42 and pawl 46 causes the engagement of end 54 of pawl 46 with a lug 52 attached to lug wheel 51. Further downward movement of piston 42 and pawl 46 causes rotation of pawl 46 in an upward direction in accordance with arrow 56. Upon pawl 46 becoming substantially perpendicular to the axis of piston 42, the upward rotation of pawl 46 is further limited so that continued downward motion of piston 42 results in rotation of lug wheel 51 and accordingly, drum 26, in a direction of arrow 53. In prototype testing it has been determined that a rotation of drum 26 between an angle of approximately 45° to 90° is satisfactory to enable the fasteners 27 within drum 26 to fall down within drum 26 and be funneled into position on the track arrangement 14.

Figure 4:
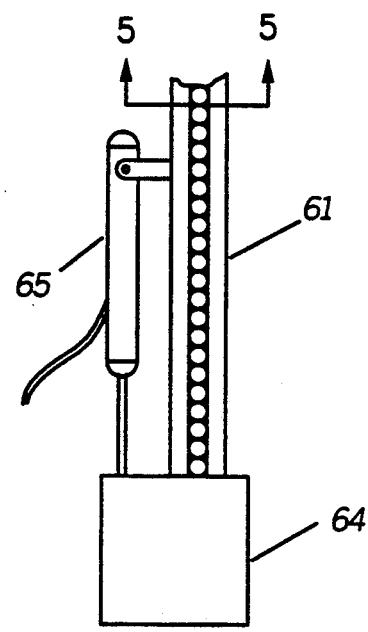
FIG. 4 illustrates a plan view of the lower portion of the track arrangement.
Figure 5:
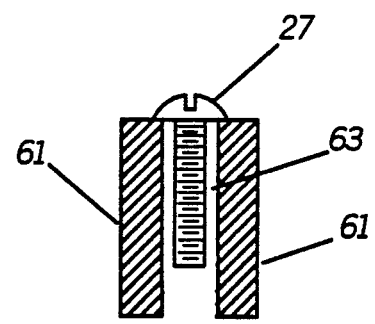
FIG. 5 shows a cross-sectional view of the track arrangement taken along the line 5—5 of FIG. 4.

Referring also to FIGS. 4 and 5, track arrangement 14 is seen to comprise elongated track members 61 having a gap 63 extending along the lengths of the tracks 61. Gap 63 provides for the positioning therein of a plurality of fasteners 27 arranged in side-by-side array. A funneling arrangement 62 is attached to the end of tracks 61 contained within drum 26. Funneling arrangement 62 provides for gathering of a plurality of fasteners 27 as they drop from the vanes 28 within drum 26 and then feeds a single fastener 27 onto track 61 and within gap 63. On the other end of track arrangement 14, is positioned an escapement mechanism 64 which is powered by an air cylinder 65. Escape mechanism 64 serves to feed one fastener 27 into a tube 82 and thence to a pneumatically driven fastener driver (not shown). A track cover 77 pivotally attached to track 61 maintains the orientation of each of the fasteners 27 as they travel down along the length of track 61. The track mechanism 14 thus far described may be of a type similar to the track mechanism shown in U.S. Pat. No. 4,732,296 issued Mar. 22, 1988, and assigned to Nasco Industries, Inc. of Fort Lauderdale, Fla. Track arrangement 14 further includes a support member 66 which is fixedly secured to base member 11.

The attachment of tracks 61 to support member 66 is by a pivotal pin 67 which allows track arrangement 14 to pivotally rotate up and down in the direction of arrows 81. The rotational up and down movement 81 of tracks 61 is accomplished by an air cylinder 68 pivotally attached 72 to a support member 71 which is appropriately attached to base member 11. A piston 69 of air cylinder 68 moves in an up and down direction as indicated by arrows 75 upon the pneumatic energizing of air cylinder 68. Piston 69 is pivotally attached 73 to tracks 61 at the upper end of piston 69. The pivotal attachment at both ends of air cylinder 68 allows air cylinder 68 and piston 69 to rock back and forth in the direction of arrows 74 during the up and down motion 75 of piston 69.

The timing of the up and down pivotal motion of track 61 is such that the end thereof within drum 26 is in a downward position when drum 26 rotates between its operating angle of rotation. Upon completion of the rotation of drum 26, the end of track 61 within drum 26 then moves to its upward position, as shown by the dashed lines in FIG. 1 of the drawings, which upward movement causes the fasteners 27 gathered on funneling arrangement 62 to position themselves one at a time within gap 63. The upward motion of the end of track 61 within drum 26, in conjunction with the downward motion of escapement end of track 61 allows gravity to move each of the fasteners 27 within track 61 to move downward one increment to compensate for an individual fastener 27 removed by an escapement mechanism 78 which is powered by an air cylinder 65.

Conventional air filter, air regulator and lubrication apparatus 90 is attached to the back of the inventive automatic fastener feeder 10 for purposes of properly filtering, regulating and distributing the air input to the various air cylinders of the automatic fastener feeding apparatus 10. The attachment of air hoses from the air filter, regulator and lubrication apparatus 90 to the air cylinders 41, 68, and 65 as well as to the escapement mechanism 64 is conventional and therefore is not further described herein.

In accordance with the above description, it is seen that a combination of drum rotation and track pivoting up and down is utilized in the automatic fastener feeding apparatus. Also, the inventive arrangement allows for a relatively small amount of pivoting of the tracks 61 as compared to the prior art track pivoting arrangements. In the inventive arrangement described herein, the track 61 may pivot, for example, between 15° and 35° from the horizontal. The escapement mechanism 64 also moves up and down with the pivoting action of the track 61. This motion imparted to the escapement mechanism 64 allows individual fasteners 27 to be fed into the escape mechanism 64 without the need for a steep angle and/or vibration of the track arrangement 14. The automatic fastener feeder 10 provided herein results in high reliability with a minimum of product cost. Furthermore, the invention herein described accomplishes the various movements associated with an automatic fastener feeder without the need for pulleys, gears, or timing belts. This also results in simplistic but reliable operation.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. Automatic fastener feeding apparatus for use with fasteners comprising:
   a base member;
   a fastener supply hopper containing a plurality of said fasteners, mounted onto said base member for rotational movement thereon; racheting means for rotationally moving said supply hopper in one direction in accordance with said racheting means moving incrementally in a first direction, and said hopper not moving in accordance with said racheting means moving in a second direction;

and pivoting track means for loading individual fasteners thereon from within said supply hopper when an end of said pivoting track means is pivoted in a down position relative to said supply hopper and for moving said fasteners along said track means by gravity when said end of said pivoting track means in is pivoted in an up position relative to said supply hopper.

2. The automatic fastener feeding apparatus of claim 1, wherein said supply hopper comprises a hollow cylindrical member closed at one end and containing a plurality of vanes radially attached to an inner cylindrical wall thereof, said vanes being spaced from each other and extending around said inner cylindrical wall.

3. The automatic fastener feeding apparatus of claim 1, wherein said track means includes funnel means at an end of said track means located within said supply hopper for funnelling individual fasteners from within said supply hopper onto said track means.

4. The automatic fastener feeding apparatus of claim 1, wherein said racheting means comprises a pawl and lug arrangement, and pivotable air piston-cylinder apparatus, said pawl being pivotally attached to said piston-cylinder apparatus whereby a first stroke of said piston-cylinder apparatus allows said pawl to slide past said lug arrangement and a second reverse direction stroke of said piston-cylinder apparatus engages said pawl with one lug of said lug arrangement and rotationally moves said hopper.

5. The apparatus of claim 4, wherein an axial shaft connects said hopper to said pawl and lug arrangement.

6. The automatic fastener feeding apparatus of claim 4, wherein said pivoting track means comprises parallel arranged and spaced track members, and a piston-cylinder apparatus attached to said track member whereby a first stroke of said piston-cylinder apparatus pivots said track members in a first horizontal position and a second stroke of said piston-cylinder apparatus pivots said track members in a second horizontal position, said second horizontal position being more inclined than said first horizontal position.

7. The automatic fastener feeding apparatus of claim 1, wherein said pivoting track means comprises parallel arranged and spaced track members, and a piston-cylinder apparatus attached to said track members whereby a first stroke of said piston-cylinder apparatus pivots said track members in a first horizontal position and a second stroke of said piston-cylinder apparatus pivots said track members in a second horizontal position, said second horizontal position being more inclined than said first horizontal position.

8. The automatic fastener feeding apparatus of claim 1, wherein movement of said racheting means is initiated with a fastener being ejected from said track members.

9. The automatic fastener feeding apparatus of claim 8, wherein completion of the movement of said racheting means initiates pivoting movement of said track means whereby said track means is pivotally moved from a first horizontal position to a second, more inclined horizontal position.

10. The automatic fastener feeding apparatus of claim 1, wherein said racheting means moves said supply hopper between 45 to 90 rotationally with each racheted incremental movement.

11. Automatic fastener feeding apparatus for use with fasteners comprising:

a base member; a fastener supply hopper containing a plurality of said fasteners, mounted onto said base member for rotational movement thereon;

racheting means for rotationally moving said supply hopper;

and pivoting track means for loading individual fasteners thereon from within said supply hopper and for moving said fasteners along said track means by gravity, said racheting means comprising a pawl and lug arrangement, and pivotable air piston-cylinder apparatus, said pawl being pivotally attached to said piston-cylinder apparatus whereby a first stroke of said piston-cylinder apparatus allows said pawl to slide past said lug arrangement and a second reverse direction stroke of said piston-cylinder apparatus engages pawl with one lug of said arrangement and rotationally moves said hopper.

* * * * *